L. GERARD.
APPARATUS FOR PRODUCING AND UTILIZING ELECTRICAL EFFLUVIA.
APPLICATION FILED AUG. 1, 1907.
982,587.
Patented Jan. 24, 1911.
3 SHEETS—SHEET 3.
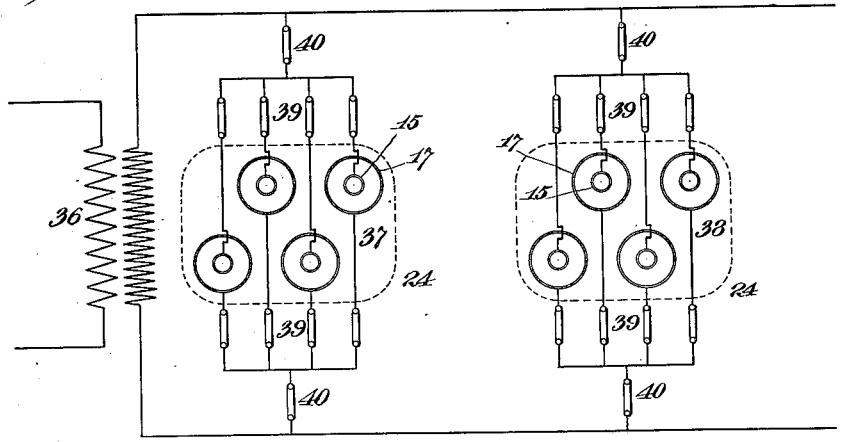
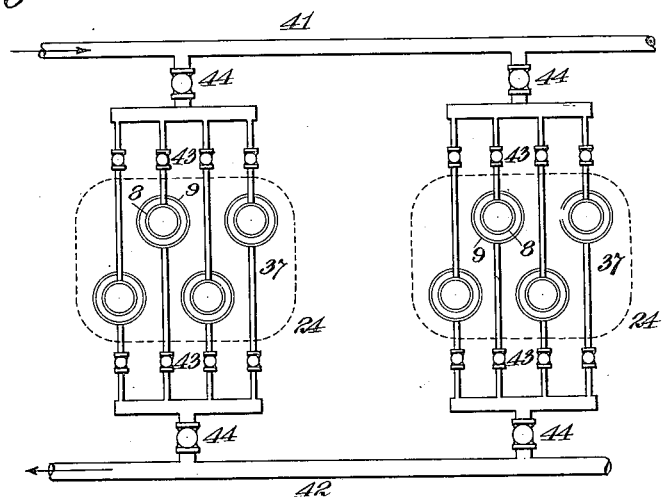

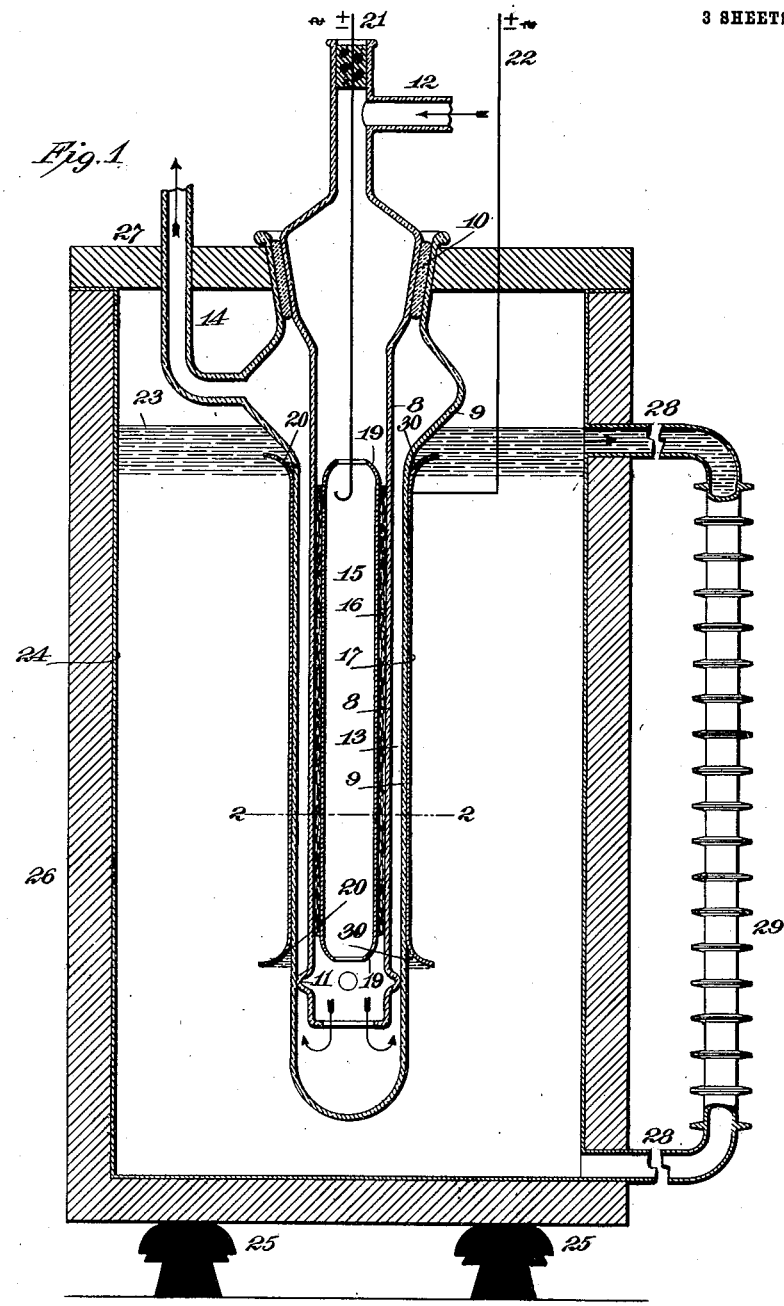

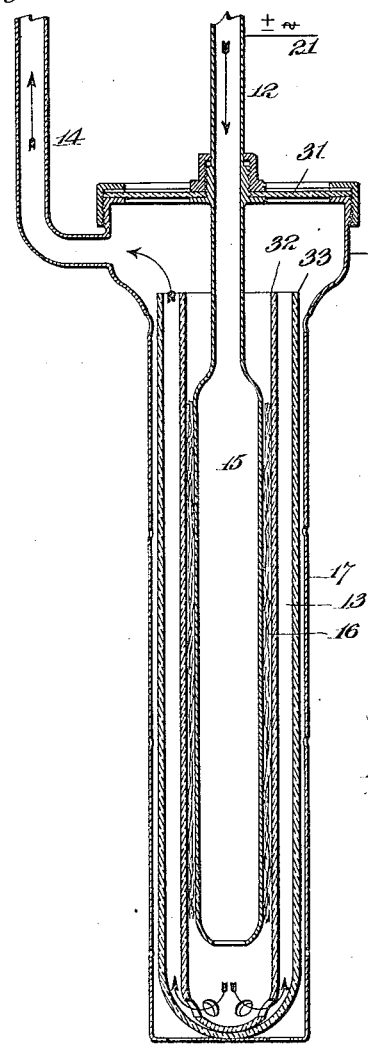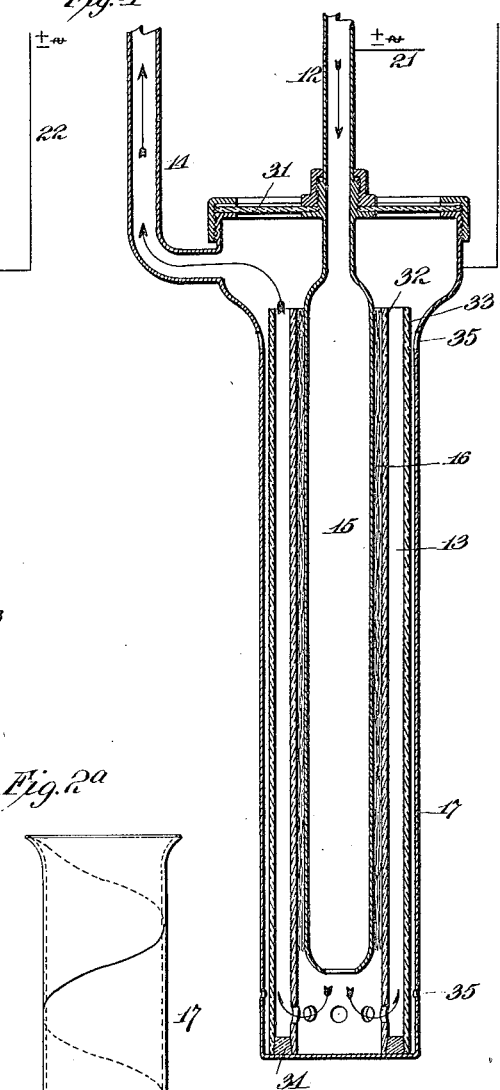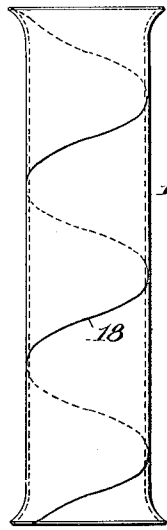

UNITED STATES PATENT OFFICE.

LÉON GERARD, OF BRUSSELS, BELGIUM, ASSIGNOR TO GERARD OZONE PROCESS COMPANY, A CORPORATION OF NEW JERSEY.

APPARATUS FOR PRODUCING AND UTILIZING ELECTRICAL EFFLUVIA.

982,587. Specification of Letters Patent. Patented Jan. 24, 1911.

Application filed August 1, 1907. Serial No. 386,659.

*To all whom it may concern:*

Be it known that I, LÉON GERARD, a citizen of the Kingdom of Belgium, residing at Brussels, Belgium, have invented a certain new and useful Improvement in Apparatus for Producing and Utilizing Electrical Effluvia, of which the following is a specification.

The object I have in view is to provide apparatus for the production of electrical effluvia, for use generally in the production of synthetic chemical actions, or those in which molecular rearrangement is involved, and more particularly for the production of ozone by the ozonification of atmospheric air or of oxygen; which apparatus will be more efficient than apparatus heretofore employed for this purpose, more reliable in operation and capable of a higher rate of work without liability to derangement. The apparatus is hereinafter described as utilized for the ozonification of atmospheric air, i. e., as an ozonizer, but its use for other purposes is within the scope of the invention.

In carrying out the invention I preferably employ smooth surface metallic electrodes preferably of cylindrical form, concentrically arranged on opposite sides of the gas gap. In order to prevent a rise in the electric the gas gap are walls of solid dielectric, such as glass, which forms the walls of the gas gap. In order to prevent a rise in the electrical pressure at the edges of the electrodes, which in case of cylindrical electrodes are at the ends of the cylinders, the space between the electrodes is increased at the ends of the cylinders by diverging the cylinders away from each other on curved lines toward their ends. By preventing a rise in surface density at the edges or ends of the electrodes, the danger of puncturing the dielectric is reduced and the apparatus may be worked at a higher rate without liability to breakage and with a greater efficiency because of the uniform current density which is produced in the gas gap as a result of this construction.

The electrodes are preferably made of thin-walled metal cylinders supported directly upon or close to the walls of the glass tubes with which they are associated. The parts of the ozonizer are supported at one end so that they are free to expand and contract longitudinally independently of each other. To permit unequal expansion and contraction diametrically of the glass and metal, so as to avoid the breaking of the glass tubes, the cylindrical metallic electrodes are either split longitudinally on straight or helicoidal lines so as to be diametrically extensible, or they may be separated from the glass tubes by a sufficient space filled with soft packing, such as asbestos, or both constructions may be employed. Preferably the inner metal cylinder is separated by loose packing from the glass tube which surrounds it, such loose packing not only permitting the independent diametrical expansion and contraction of the metal and glass tubes, but also preventing the circulation of the gas through the space between the metal and glass surfaces; and preferably the outer metal cylinder is split longitudinally and held by light contact upon the outer glass so as to be diametrically extensible in response to thermal, mechanical and electrical actions.

The air or other gas passing through the gas gap first passes through the cylindrical central electrode in contact with its inner surface, this electrode forming a part of the air passage from the source of air supply to the gas gap and is cooled by the flow of cool gas over its inner surface. The outer metallic electrode is cooled by the immersion of the ozonizer in a body of liquid insulation. For this purpose I use a liquid having great thermal and dielectric capacity, such as suitable oils or resinous solutions freed of water and acids. The insulating liquid may be circulated for the purpose of cooling it through radiators of any suitable form cooled by air or water and the circulation may be produced by power or by difference in temperature.

The liquid insulation is excluded from the air gap by closing the lower end of the dielectric tube supporting the outer electrode. This arrangement provides an effective safeguard for the apparatus because, if the solid dielectric is punctured or broken, the insulating liquid will flow into and fill the gas gap, thus not only preventing an electrical short circuit, but also shutting off the flow of gas through the ozonizer, so that the operation of other ozonizers connected in multiple arc with the same source of electrical energy and gas supply will not be interfered with. The liquid dielectric also enters as a film between the outer electrode and the glass tube upon which it is supported, forming part of the dielectric between the electrode and the gas gap and excluding air bubbles from this space. The film of the dielectric is maintained by the capillary action between the surfaces as well as by the independent movements of the surfaces during expansion and contraction, the oil entering at the ends of the space and also at the gap produced by the splitting of the electrode longitudinally.

Since water is not employed in the ozonizer either to cool or to form the electrodes, the circuit of the ozonizer can be a non-grounded or complete metallic circuit. I have found that by surrounding one or a group of these ozonizers with a body of conducting material, of relatively large surface, located adjacent to the ozonizers and insulated from the ground, a secondary condenser action is produced by the inductive action of the electrodes (particularly the outer electrode) upon the adjacent conducting body, with the result of introducing a capacity into the system which has a regulating action, modifying the peaks of the current waves so as to prevent the puncture of the dielectric and doing away with the necessity of employing condensers and choke coils in the circuit. A convenient arrangement and one that I prefer is to provide a surrounding metallic surface in the form of a metal box or container for holding the liquid dielectric, in which dielectric one or a number of ozonizers may be immersed. The metal box, besides being insulated from the ground, may be protected from external contact by a covering of wood or other suitable insulation.

The means for regulating and protecting the ozonizers enables them to be connected directly with the source of energy, such as a step-up transformer, without the interposition in the circuit of condensers and choke coils, and this connection can be made by a non-grounded or complete metallic circuit and the ozonizers can be operated in multiple without interfering with each other and can be independently connected with and disconnected from the circuit, or the ozonizers can be connected in series or multiple series if desired. To secure the complete independence of the ozonizers their gas gaps may also be connected in multiple with the gas supply and receiving tanks and suitable switches and cocks are provided for connecting and disconnecting the ozonizers independently or in groups with and from the electrical and gas circuits.

This construction of ozonizer enables the employment of a high voltage at the electrodes and producing, notwithstanding the high voltage, a silent discharge of high tension across the gap between the dielectric walls interposed between the electrodes, thus utilizing therein a considerable amount of energy without an undue rise in temperature. The low temperature character of the electrical discharge (aided by the cooling arrangements described) prevents the air or gas flowing through the gap from attaining a temperature sufficiently high to reconvert the ozone formed into oxygen, and greatly increases the efficiency of the electrical energy in the ultimate production of ozone. The divergence of the electrodes at their edges and the secondary condenser action aid in this result, since they maintain throughout the gap a relatively uniform intensity of the extended high tension, low temperature, field and prevent the production of sparks which, being of high temperature, would reconvert ozone into oxygen. My ozonizer has brought about a marked advance in economy of production as well as in concentration, in the manufacture of ozone from air.

In the accompanying drawings forming a part hereof: Figure 1 is a vertical section of a form of ozonizer embodying the invention including the inclosing metallic tank and liquid dielectric; Fig. 2 is a cross section of the ozonizer on line 2—2, Fig. 1; Fig. 2$^a$ is an elevation of the outer electrode showing it split along helicoidal lines; Fig. 3 is a vertical section of a modified form of ozonizer; Fig. 4 is a vertical section of another modified form of the ozonizer; Fig. 5 is a diagram illustrating the preferred electrical connections of the ozonizers; and Fig. 6 is a diagram illustrating the preferred gas connections of the ozonizers.

The ozonizer may be constructed of two glass tubes 8, 9 (Figs. 1 and 2). The outer tube 9 is open at its upper and closed at its lower end and receives the inner tube 8 which is cemented to the conical seat 10 in the outer tube. The tube 8 extends nearly to the bottom of the tube 9 where it may be provided with protuberances 11 to loosely center it in the tube 9. The upper end of the tube 8 is closed by a cork and is provided with a lateral tube 12, through which the air or other gas enters the ozonizer.

The lower end of the tube 8 is open so that the gas flowing downwardly and entering the outer tube 9 at its lower end flows upwardly through the space 13 between the tubes, such space being the gas gap of the ozonizer in which the gas is subjected to the electric current. Near the upper end of the outer tube 9, but below the seat of the inner tube 8 therein, a lateral tube 14 connects with the tube 9 for the delivery of the ozonized gas.

The central electrode 15 is a light tube of metal having a smooth polished outer peripheral surface and is supported within the inner tube 8 close to the inner surface of that tube, but with a space between the surfaces sufficient to permit unequal diametrical expansion and contraction of the glass and metal. This space is filled with a soft packing 16 of suitable insulating material, such as asbestos, mica, solid paraffin or the like, which permits unequal expansion and contraction of 8 and 15 and at the same time prevents circulation of the gas between adjacent surfaces. The ends of the tubular electrode 15 are open so that the gas entering the ozonizer flows through this tube on its way to the gas gap and serves to cool the electrode. Mounted upon the outer tube 9 of the ozonizer is the outer electrode 17, which is also a light cylinder of metal having a smooth inner surface. This electrode is preferably held by light contact with the tube 9 and is split longitudinally or along helicoidal lines as shown at 18 (Figs. 2 and 2ᵃ) so as to be diametrically extensible to permit unequal contraction and expansion of the glass and metal.

The electrodes 15 and 17 are placed opposite each other and are of approximately the same length. They are curved away from each other at their ends 19, 20, so as to prevent an excess of electrical pressure at the edges and produce a uniformity of current density in the gas gap. Wires 21, 22, extend from the electrodes 15, 17, for connection with the electrical circuit.

The ozonizer is immersed in a body of liquid dielectric 23, such as a suitable oil having a high thermal and dielectric capacity, and this is contained in a metal tank 24, which is insulated from the ground by insulators 25. As an example of oil suitable for this purpose, there may be used what is known to the trade as "mineral seal vacuum oil". The oil tank may also be incased in a wood or other insulating shell 26, and the ozonizer is supported at its upper end in the insulating cover 27 of the tank. From the sides of the tank 24, at different elevations, extend pipes 28, connected with radiators 29 through which the oil may be circulated by gravity for reducing the temperature. The liquid dielectric 23 forms a film 30 between the outer electrode 17 and the outer wall of the glass tube 9. The liquid film excludes air bubbles from the space between the metal and glass surfaces and constitutes a part of the dielectric interposed between the outer electrode and the gas gap.

The liquid dielectric is excluded from the gas gap by the closed lower end of the tube 9, but if the tube 9 is punctured or broken down by the electrical discharge, the liquid dielectric will flow through the break into the gas gap, filling the same and preventing an electrical short circuit as well as cutting off the flow of gas through the gap.

In the modified form of ozonizer shown in Fig. 3 the outer electrode 17 forms the main supporting element of the ozonizer. It is made as a tube closed at its lower end and the inner metal electrode, which is also tubular, is supported at the top of this outer tube and is insulated therefrom by a glass or other insulating cover 31. Between the two electrodes are placed glass tubes 32 and 33, which rest on the bottom of the outside metal tube 17. The outer tube 33 is closed at its lower end and the inner tube 32 is perforated at its lower end so that the gas flowing down through the central electrode will pass into the space between the glass tubes 32, 33, and will flow upwardly therethrough. The space between the inner glass tube 32 and the central electrode 15 is filled with a soft packing of insulating material to prevent the flow of gas therethrough. Holes 35 are provided in the shell 17 to permit a film of oil to enter between the outer glass tube 33 and the outer electrode 17. This construction, like that of Fig. 1, allows the oil to flow into the gas gap when the solid dielectric is punctured.

The form of ozonizer shown in Fig. 4 differs from that shown in Fig. 3 only in the construction of the tubes 32 and 33. The bottom ends of these tubes 32 and 33 are in this modification straight and are separated by a ring of glass 34 ground to fit accurately the ends of the tubes. The ozonizers have their electrodes connected preferably in multiple arc by a complete non-grounded metallic circuit directly with a suitable source of electrical energy, such as an alternating current transformer 36 (Fig. 5) whose primary may be connected with an ordinary commercial circuit of alternating currents operating at 60 cycles, and whose secondary, connected to the electrodes of the ozonizers, will step up the voltage to the desired high voltage.

In Fig. 5 two groups of ozonizers 37, 38 are shown, each group being located in an inclosing metal tank 24. The separate circuits of the ozonizers may be controlled by suitable switches 39, while switches 40 may be employed to make or break the circuit for the entire group. As already explained the inclosing metal tanks form adjacent conducting bodies of large surface which are acted upon inductively by the electrodes of the ozonizers and serve to regulate and modify the current by a secondary condenser action which prevents excessive fluctuations and does away with the necessity of using choke coils and condensers external to the ozonizers, enabling the electrodes of the ozonizers to be connected directly with the source of energy.

The inclosing metal tank 24, is as described above, mounted on insulators but it is found in practice that there is some leakage from the tank to the earth and on this leakage may depend the improved result obtained, but I do not wish to limit myself to this or any other theory of action of the tank.

In Fig. 6 is illustrated in diagram the connections of the gas circuits to the ozonizers in multiple arc with the gas inlet and outlet pipes 41 and 42. Cocks 43 are provided for cutting off the flow of gas to the individual ozonizers, while cocks 44 may be employed to disconnect a group of ozonizers from the gas circuit. Several ozonizers may be connected in series of two, three or more and a number of such series may be connected in multiple arc.

What I claim as new and useful and desire to secure by Letters Patent is:

1. An electrical effluvia apparatus provided with a gas gap through which the gas to be treated flows, the opposing surfaces of the gas gap diverging from each other on curved lines toward their edges, substantially as set forth.

2. An electrical effluvia apparatus provided with an annular gas gap through which the gas to be treated passes, the opposing surfaces of the gas gap at the entrance of such gap diverging from each other outwardly on curved lines, substantially as set forth.

3. Apparatus for the production and utilization of electrical effluvia comprising electrodes of opposite polarity arranged to form a gas gap characterized by the corresponding parts of the surfaces of the electrodes of opposite polarity being situated at such distances apart that uniform current density is obtained in the gap.

4. An electrical effluvia apparatus having smooth metallic electrodes arranged on opposite sides of the gas gap, the surfaces of such electrodes being separated varying distances whereby a uniform distribution of electrical pressure on such surfaces and a uniform distribution of current density in said gas gap will be produced.

5. An electrical effluvia apparatus having smooth surface metallic electrodes arranged on opposite sides of the gas gap, the surfaces of such electrodes being separated varying distances, and walls of solid dielectric interposed between the gas gap and said electrodes.

6. In an electrical effluvia apparatus, the combination of smooth surface metallic electrodes concentrically arranged on opposite sides of the gas gap, walls of solid dielectric interposed between the electrodes and the gas gap, and means permitting unequal diametric expansion and contraction of the electrodes and solid dielectric.

7. In an electrical effluvia apparatus, the combination with a cylinder of dielectric forming the outer wall of the gas gap, of a cylindrical metallic electrode surrounding the dielectric cylinder, a body of insulating liquid surrounding and in contact with the metallic electrode, and means for cooling the liquid insulation.

8. In an electrical effluvia apparatus, the combination with smooth surface cylindrical metallic electrodes concentrically arranged and diverging at the ends of the cylinders, of liquid insulation in contact with one of the electrodes for cooling the same.

9. In an electrical effluvia apparatus, the combination with smooth surface cylindrical metallic electrodes concentrically arranged and diverging at the ends of the cylinders, cylinders of solid dielectric interposed between the electrodes and the gas gap, a gas passage to the gas gap through the central electrode, and a body of liquid insulation in contact with the outer electrode.

10. The combination with an electrical effluvia apparatus, of means preventing a short-circuit between the electrodes when the dielectric is punctured, and means cutting off the flow of gas through the gas gap when the dielectric is punctured.

11. In an electrical effluvia apparatus, the combination with a metallic electrode and a body of insulating liquid in which the electrode is immersed, of a wall of solid dielectric interposed between the electrode and the gas gap and preventing the admission of the liquid insulation to the gas gap, whereby the puncturing of the solid dielectric will permit the liquid insulation to fill the gas gap.

12. The combination with an electrical effluvia apparatus, of an adjacent conducting body of large surface insulated from the ground and acted on inductively by the electrodes of the apparatus whereby a surrounding condenser action will be produced modifying and regulating the operation of the electrical effluvia apparatus.

13. The combination with an electrical effluvia apparatus, of an adjacent conducting body of large surface insulated from the ground and acted on inductively by the electrodes of the apparatus, and a body of liquid dielectric interposed between the apparatus and the adjacent conducting body.

14. The combination with an electrical effluvia apparatus having concentrically arranged electrodes, of a cylindrical conducting body of large surface surrounding the apparatus and insulated from the ground, and a body of liquid dielectric interposed between the apparatus and the surrounding conducting body.

15. In an electrical effluvia apparatus, electrodes comprising a space volume wherein ozone is produced and being uniformly spaced apart throughout the major portion of this volume to produce a uniform current density, and gradually separated at the limits of said volume to prevent dangerous current concentration at said limits.

16. In combination with a suitable electrical supply, an electrical effluvia apparatus comprising electrodes, suitable dielectrics and a capacity auxiliary to said electrodes adapted to control the wave form of the potential supplied to said electrodes.

17. In combination with a suitable source of electrical supply, an electrical effluvia apparatus comprising electrodes, suitable dielectrics and a capacity auxiliary to said electrodes insulated therefrom and adapted to absorb relatively rapid influxes of energy without materially affecting the normal flow of current between said electrodes.

18. In combination with a suitable source of electrical supply, an electrical effluvia apparatus comprising electrodes, suitable dielectrics and capacity auxiliary to said electrodes in yielding electrical relation thereto and adapted to oppose momentary increases or decreases of current density between said electrodes.

19. In combination with a suitable source of electrical supply, an electrical effluvia apparatus comprising electrodes, suitable dielectrics, and a conductor adapted to take an intermediate potential between the outer electrode and surrounding objects and imperfectly connected electrically with each.

20. In an electrical effluvia apparatus, in combination with a suitable source of electrical supply, concentrically arranged cylindrical metallic electrodes spaced apart to form a gap, and formed to prevent dangerous local concentration of current density, and a liquid dielectric surrounding the outer of said electrodes and contacting with both its inner and outer surfaces.

21. In an electrical effluvia apparatus, in combination with a suitable source of electrical supply, metallic electrodes spaced apart to form a gap, a double walled gas passage extending through said gap and a liquid dielectric material arranged to circulate between one of said electrodes and the outer of said walls.

22. In an electrical effluvia apparatus having two smooth-surface, cylindrical, concentrically arranged metallic electrodes included in an electric circuit, a suitable source of current supply for said circuit, a gap for the passage of gas between said electrodes and an electrical capacity insulated from said circuit arranged in parallel relation thereto and adapted to yieldingly regularize the flow of current across said gap.

23. In an electrical effluvia apparatus, smooth-surface cylindrical, metallic electrodes concentrically arranged to inclose a space volume wherein ozone is produced, and being uniformly spaced apart throughout the major portion of this volume to produce a uniform current density, and being gradually separated at the limits of said volume to prevent dangerous current concentration at said limits.

24. In an electrical effluvia apparatus, in combination with a suitable source of electrical supply, smooth-surface cylindrical metallic electrodes concentrically arranged and spaced apart to form a gap, solid dielectric material segregating a portion of the volume of said gap to form a gas passage and liquid dielectric material surrounding the outer of said electrodes and in contact with both its inner and outer surfaces.

25. In an electrical effluvia apparatus, the combination with a suitable source of electrical supply, of smooth surface cylindrical metallic electrodes concentrically arranged and spaced apart to form a gap, a double walled gas passage formed of solid dielectric material located between said electrodes and in contact therewith, and a body of oil in contact with the outer electrode.

26. In an electrical effluvia apparatus, the combination of walls of solid dielectric spaced apart to form a gap, smooth surface metallic electrodes in contact with the outer surfaces of such dielectric walls, a gas passage conveying the gas in contact with one of said electrodes on its way to the gap, and means for cooling the other electrode.

27. In an electrical effluvia apparatus, the combination of walls of solid dielectric spaced apart to form a gap, smooth surface metallic electrodes in contact with the outer surfaces of such dielectric walls, a gas passage conveying the gas in contact with one of said electrodes on its way to the gap, and a liquid insulating cooling medium in contact with the other electrode.

28. In an electrical effluvia apparatus, the combination of tubes of solid dielectric concentrically arranged and spaced apart to form a gap, smooth surface cylindrical metallic electrodes in contact with the outer and inner surfaces of the outer and inner dielectric tubes, respectively, a gas passage conveying the gas in contact with one of said electrodes on its way to the gap, and means for cooling the other electrode.

29. In an electrical effluvia apparatus, the combination of tubes of solid dielectric concentrically arranged and spaced apart to form a gap, smooth surface cylindrical metallic electrodes in contact with the outer and inner surfaces of the outer and inner dielectric tubes, respectively, a gas passage conveying the gas in contact with one of said electrodes on its way to the gap, and a liquid insulating cooling medium in contact with the other electrode.

30. In an electrical effluvia apparatus, the combination with tubes of solid dielectric concentrically arranged and spaced apart to form a gap, smooth surface cylindrical metallic electrodes attached respectively to the outer surface of the outer dielectric tube and to the inner surface of the inner dielectric tube, means for conveying the gas on its way to the gap through such inner tube in contact with the electrode therein, and means for cooling the other electrode.

31. In an electrical effluvia apparatus, the combination of concentric tubes of dielectric material, means for supporting the tubes at one end, gas connections with the tubes at the support end, the outer tube being closed at its free end, smooth surface cylindrical metallic electrodes supported respectively on the outer surface of the outer dielectric tube and on the inner surface of the inner dielectric tube, and a fluid insulating cooling medium surrounding the outer tube and in contact with the metallic electrode carried thereby.

32. In an electrical effluvia apparatus, the combination of concentric tubes of dielectric material, means for supporting the tubes at one end, gas connections with the tubes at the support end, the outer tube being closed at its free end, smooth surface cylindrical metallic electrodes supported respectively on the outer surface of the outer dielectric tube and on the inner surface of the inner dielectric tube, such electrodes diverging relatively at their ends, and a fluid insulating cooling medium surrounding the outer tube and in contact with the metallic electrode carried thereby.

33. In an electrical effluvia apparatus, the combination of concentric tubes of dielectric material supported at their upper ends and projecting downwardly into an inclosing chamber, the outer tube being closed at its free end, gas connections with the tubes at their upper ends, smooth surface cylindrical metallic electrodes supported respectively on the outer surface of the outer dielectric tube and on the inner surface of the inner dielectric tube, and a fluid insulating cooling medium surrounding the outer tube and in contact with the metallic electrode carried thereby.

34. In an electrical effluvia apparatus, the combination of concentric tubes of dielectric material supported at their upper ends and projecting downwardly into an inclosing chamber, the outer tube being closed at its free end, gas connections with the tubes at their upper ends, smooth surface cylindrical metallic electrodes supported respectively on the outer surface of the outer dielectric tube and on the inner surface of the inner dielectric tube, such electrodes diverging relatively at their ends, and a fluid insulating cooling medium surrounding the outer tube and in contact with the metallic electrode carried thereby.

35. In an electrical effluvia apparatus, the combination of a gap having walls of dielectric material, smooth surface electrodes outside such walls, means for cooling the electrodes, means conveying alternating electric currents to such electrodes, and means preventing concentration of the discharge at the edges of such electrodes, whereby there will be maintained in said gap a silent high-tension low-temperature electrical discharge of relatively uniform intensity.

36. In an electrical effluvia apparatus, the combination of a gap having walls of dielectric material, smooth surface electrodes outside such walls, relatively diverging at their edges, means for cooling the electrodes, means conveying alternating electric currents to such electrodes, and means for controlling the wave form of the current, whereby there will be maintained in said gap a silent high tension, low temperature, electrical discharge of relatively uniform intensity.

This specification signed and witnessed this 29th day of July, 1907.

LÉON GERARD.

Witnesses:
RICHARD N. DYER,
JOHN S. LOTSCH.